(12) United States Patent
Cafaro et al.

(10) Patent No.: US 10,988,287 B2
(45) Date of Patent: Apr. 27, 2021

(54) CONTAINER AND OPENING ARRANGEMENT FOR BEVERAGE PRODUCTION

(71) Applicant: Bedford Systems LLC, Bedford, MA (US)

(72) Inventors: Enrico Raffaele Cafaro, Beverly, MA (US); Michael Sack, North Reading, MA (US); Ian Scott Rice, Framingham, MA (US)

(73) Assignee: BEDFORD SYSTEMS LLC, Bedford, MA (US)

( * ) Notice: Subject to any disclaimer, the term of this patent is extended or adjusted under 35 U.S.C. 154(b) by 401 days.

(21) Appl. No.: 15/829,754

(22) Filed: Dec. 1, 2017

(65) Prior Publication Data

US 2018/0155091 A1  Jun. 7, 2018

Related U.S. Application Data

(60) Provisional application No. 62/428,900, filed on Dec. 1, 2016.

(51) Int. Cl.
*B65D 41/50* (2006.01)
*B65D 85/804* (2006.01)
(Continued)

(52) U.S. Cl.
CPC ............. *B65D 41/50* (2013.01); *A47J 31/407* (2013.01); *A61J 1/1406* (2013.01); *B65D 41/46* (2013.01); *B65D 85/80* (2013.01); *B65D 85/8043* (2013.01)

(58) Field of Classification Search
CPC ........ B65D 41/46; B65D 41/50; B65D 43/02; B65D 43/0204; A47J 31/407; A61J 1/1406

See application file for complete search history.

(56) References Cited

U.S. PATENT DOCUMENTS 5,817,082 A * 10/1998 Niedospial, Jr. ...... A61J 1/2096
604/414
6,142,063 A   11/2000 Beaulieu et al.
(Continued)

FOREIGN PATENT DOCUMENTS

CN    102946772 A    2/2013
CN    103189284 A    7/2013
(Continued)

OTHER PUBLICATIONS

International Search Report and Written Opinion of the International Searching Authority for International Patent Application No. PCT/US2017/064343, dated Feb. 19, 2018 (11 pages).

*Primary Examiner* — Moshe Wilensky
*Assistant Examiner* — Kyle A Cook
(74) *Attorney, Agent, or Firm* — Dorsey & Whitney LLP

(57) ABSTRACT

Systems, methods and containers for forming a beverage. A container includes a closure arranged with a movable element that is movable to pierce a membrane and permit beverage material in the container to exit. The movable element can include a piercing element that pierces the membrane. Gas can be introduced into the container to force beverage material to exit the container. A gas inlet port can be provided with the closure and arranged to mate with a gas source of a beverage machine.

29 Claims, 7 Drawing Sheets

(51) Int. Cl.
*A47J 31/40* (2006.01)
*A61J 1/14* (2006.01)
*B65D 41/46* (2006.01)
*B65D 85/80* (2006.01)

(56) References Cited

U.S. PATENT DOCUMENTS

| | | |
|---|---|---|
| 6,606,938 B2 | 8/2003 | Taylor |
| 6,644,173 B2 | 11/2003 | Lazaris et al. |
| 7,165,488 B2 | 1/2007 | Bragg et al. |
| 7,316,178 B2 | 1/2008 | Halliday et al. |
| 2008/0029540 A1* | 2/2008 | Johnson .............. B65D 75/5877 222/83 |
| 2016/0152409 A1* | 6/2016 | Cafaro .................... A47J 31/06 426/115 |
| 2019/0016580 A1 | 1/2019 | Krüger et al. |
| 2019/0256279 A1* | 8/2019 | Muhlemann .......... A47J 31/407 |

FOREIGN PATENT DOCUMENTS

| | | |
|---|---|---|
| WO | 2010076698 A1 | 7/2010 |
| WO | 2011094677 A2 | 8/2011 |
| WO | 2012146470 A1 | 11/2012 |
| WO | 2014037598 A1 | 3/2014 |
| WO | 2016040268 A2 | 3/2016 |

\* cited by examiner

CONTAINER AND OPENING ARRANGEMENT FOR BEVERAGE PRODUCTION

RELATED APPLICATIONS

This application claims the benefit of priority under 35 U.S.C. § 119 of U.S. Provisional Application Ser. No. 62/428,900 filed on 1 Dec. 2016, titled "Container and Opening Arrangement for Beverage Production," the entire contents of which is hereby incorporated by reference in its entireties.

BACKGROUND

The exemplary system and methods described herein relate to containers for holding a beverage material and methods for accessing such containers.

Historically, a number of self-serve appliances have been developed wherein a user desiring to enjoy a fresh cup of coffee merely needs to insert a cartridge or capsule containing powder instant flavor into the self-serve appliance. The appliance then opens the cartridge or capsule internal to the machine and combines the flavored powder with water to generate the desired beverage.

A number of different piercing elements are used by the prior art to pierce the cartridges or capsules, thereby allowing for the generation of the desired beverage. U.S. Pat. No. 7,316,178 to Halliday et. al. teaches a beverage preparation machine for preparing a beverage from a cartridge containing one or more beverage ingredients including a first piercing element for forming an inlet in a cartridge received in the beverage preparation machine, and a second piercing element for forming an outlet in the cartridge. According to Halliday, the first and second piercing elements are formed as a single removable unit that forms a part of the beverage preparation machine. However, with Halliday and other traditional self-serve appliances, including the piercing element as part of the appliance creates a location susceptible to cross-contamination or reduced sterility.

SUMMARY

Aspects of the exemplary system and method relate to a container that can be used to make a beverage, such as a carbonated and/or flavored beverage, a still flavored beverage, a hot flavored beverage, and others. While not required, the container can be usable with a beverage machine which can use the container and its contents to form a beverage. In some embodiments, a container can hold a beverage material that can be used to make a beverage, for example by mixing the beverage material with water or other liquid. A beverage material included in a container can include any suitable beverage making materials (beverage material), such as concentrated syrups, ground coffee or liquid coffee extract, tea leaves, dry herbal tea, powdered beverage concentrate, dried fruit extract or powder, natural and/or artificial flavors or colors, acids, aromas, viscosity modifiers, clouding agents, antioxidants, powdered or liquid concentrated bouillon or other soup, powdered or liquid medicinal materials (such as powdered vitamins, minerals, bioactive ingredients, drugs or other pharmaceuticals, nutraceuticals, etc.), powdered or liquid milk or other creamers, sweeteners, thickeners, and so on. (As used herein, "mixing" of a liquid with a beverage material includes a variety of mechanisms, such as the dissolving of substances in the beverage material in the liquid, the extraction of substances from the beverage material, and/or the liquid otherwise receiving some material from the beverage material or otherwise combining with the beverage material).

In one aspect of the exemplary system and method, a beverage container includes a vessel having an internal space and an opening to the internal space. In some embodiments, the opening to the internal space can be located at a lower or bottom side of the vessel. For example, the vessel can include a bottom, a sidewall extending upwardly from the bottom, and a top at an upper portion of the sidewall, and the opening can be located at the bottom. A beverage material can be located in the internal space, and a closure can be attached to the vessel and close the opening, e.g., to help keep the beverage material in the internal space. The closure can include a pierce-able membrane that seals the opening closed and a movable element positioned outside of the internal space that is movable relative to the membrane. The movable element can pierce the membrane so as to allow the beverage material to exit the internal space, as well as to introduce gas into the internal space to aid the beverage material in exiting the vessel. In one embodiment, the movable element can include a piercing element movable to pierce the membrane, a channel to conduct flow of beverage material from the internal space, and a gas inlet port arranged to couple with a gas supply of a beverage machine and deliver gas into the internal space through a hole in the membrane to force beverage material to flow into the channel.

The closure can engage the vessel in different ways, such by a snap fit to the vessel at the opening, by welding, an adhesive, threaded engagement, etc. The closure can have a pathway extending from a top of the closure to a bottom of the closure, and the membrane can be attached in the closure and/or at the opening of the vessel to occlude the pathway. In some embodiments, the membrane can include a sheet of material that is impermeable, such as a polymer/foil laminate, a foil, a polymer sheet, etc. In some cases, the closure can include a wall, such as a cylindrically shaped wall, that defines a pathway through the closure, and the wall can include a ledge at an inner surface of the wall, e.g., that extends radially inwardly from the inner surface. The membrane can be attached to the ledge to occlude the pathway, e.g., by adhering the membrane to the ledge so as to cover an opening formed by the ledge.

In one embodiment, the movable element can be positioned in the pathway and be movable toward the membrane such that a piercing element pierces the membrane to open the pathway to flow. In some cases, the movable element includes a disc mounted for movement toward the membrane, and the piercing element can extend upwardly from the disc to pierce the membrane with movement of the disc toward the membrane. A channel can extend through the piercing element, e.g., to provide a flow path for beverage material to exit.

In some cases, the closure includes a detent arranged to maintain the movable element at a first position in which the membrane is not pierced by the piercing element, and at a second position in which the membrane is pierced by the piercing element. Such a configuration can allow a user to readily determine whether a container has been used to form a beverage or not, e.g., because the closure positioned in the second position indicates a used state for the container.

In one embodiment, the gas inlet port of the movable element can include an annular groove formed on a bottom side of the movable element and one or more gas openings through the movable element to conduct gas from the annular groove to an upper side of the movable element.

Such an arrangement can allow for easier mating of a gas supply of a beverage machine because the annular groove can mate with the supply in any rotational position of the container. In some cases, the piercing element can extend upwardly from the upper side of the movable element and be arranged to pierce the membrane with upward movement of the movable element. The closure can be arranged to conduct gas from the gas inlet port through a space between the membrane and an exterior of the piercing element with the piercing element extending through the membrane. For example, gas can enter the vessel through a gap or space between an outer surface of the piercing element and the membrane, and beverage material can exit via a channel through the piercing element. Alternately, the gas inlet port can include an inlet piercing element arranged to pierce the membrane with movement of the movable element toward the membrane to introduce gas into the internal space. Thus, the gas inlet port can form an opening in the membrane to allow gas entry while a piercing element forms a separate opening in the membrane for beverage material exit.

In some embodiments, the movable element can be connected to the wall of the closure by a flexible connector that allows the movable element to move towards the vessel opening while remaining attached to the wall. For example, the flexible connector can include an annular diaphragm having a U-shaped cross section in a radial direction, and the movable element can include a disc attached at an inner side of the annular diaphragm.

In some embodiments, the container includes first and second vessels with the first vessel containing beverage material and the second vessel containing a gas source arranged to emit a pressurized gas for dissolution in a beverage. Such a container can be useful when used with a beverage machine that carbonates and flavors water or other liquid to form a beverage. In some embodiments, the second vessel includes a top surface that is pierce-able to access the gas source, e.g., the gas source can include a zeolite gas source arranged to release gas in the presence of a liquid, and a beverage machine can pierce the top surface to introduce water into the second vessel to cause carbonating gas to exit the second vessel.

In another aspect of the exemplary system and method, a beverage system includes a beverage container having a vessel with an internal space containing a beverage material and an opening to the internal space. A closure can be attached to the vessel and close the opening. A beverage machine can include a container receiver arranged to receive the beverage container and use the beverage material for dispensing a beverage. In some embodiments, the container receiver can include a clamp arranged to engage the closure of the beverage container and force a piercing element of the closure to move toward and pierce a membrane closing the opening of the vessel. The container receiver can also include a pressurized gas supply arranged to force gas into the vessel to cause the beverage material to exit the vessel via the closure.

The container can be arranged as described above, e.g., the closure can include a membrane sealing the opening closed and a movable element positioned outside of the internal space that is movable relative to the membrane. The movable element can include a piercing element movable to pierce the membrane, and a channel to conduct flow of beverage material from the internal space. A gas inlet port of the closure can be arranged to couple with the pressurized gas supply of the beverage machine and deliver gas into the internal space through a hole in the membrane to force beverage material to flow into the channel. Other features of the container described above can be employed as well.

These and other aspects of the exemplary system and method will be apparent from the following description and claims.

BRIEF DESCRIPTION OF THE DRAWINGS

Aspects of the exemplary systems and methods are described with reference to the following drawings in which like numerals reference like elements, and wherein.

DETAILED DESCRIPTION

It should be understood that aspects of the exemplary systems and methods are described herein with reference to the figures, which show illustrative embodiments. The illustrative embodiments described herein are not necessarily intended to show all embodiments in accordance with the exemplary systems and methods, but rather are used to describe a few illustrative embodiments. Thus, aspects of the invention are not intended to be construed narrowly in view of the illustrative embodiments. In addition, it should be understood that aspects of the exemplary systems and methods can be used alone or in any suitable combination with other aspects of the invention.

Figure 1:
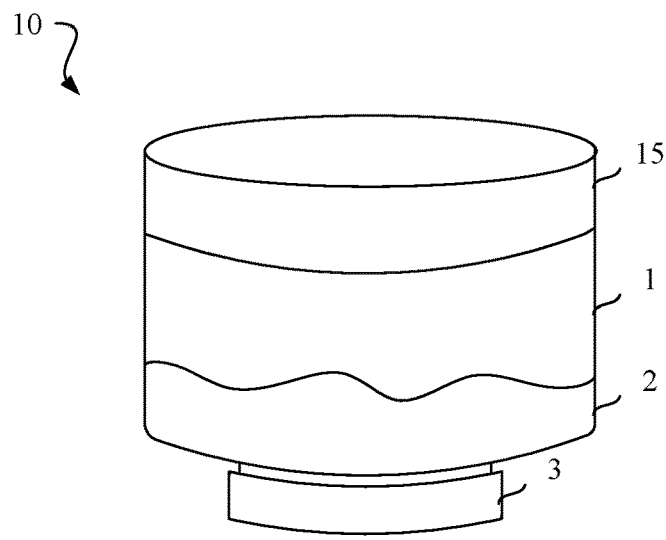
FIG. 1 shows a perspective view of an illustrative embodiment of a beverage container.
Figure 2:
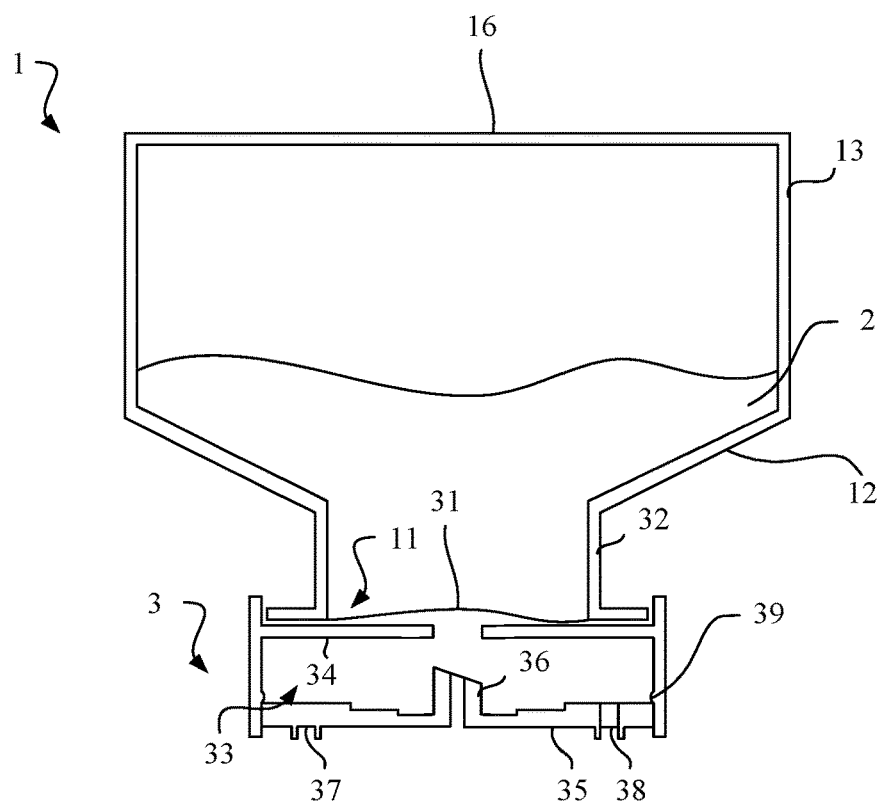
FIG. 2 shows a cross sectional view of a beverage container in an embodiment.

FIGS. 1 and 2 show an illustrative embodiment of a beverage container that incorporates one or more features of the present exemplary systems and methods. As described in more detail below, the container can be used with a beverage machine to form a beverage. For example, the container 10 can include a vessel 1 that holds a beverage material 2 that can be dispensed from the container 10 by a beverage machine. The beverage material 2 can be mixed with water or other liquid to form a beverage, or the beverage material 2 can be dispensed for consumption without dilution or mixing with any other ingredient. As an option, the container 10 can include a second vessel 15, which can include a source of pressurized gas that is used to carbonate a beverage liquid, or another beverage material 2 that can be mixed with the beverage material 2 in the first vessel 1. The two beverage materials 2 can be maintained in separated, isolated spaces prior to use in forming a beverage, e.g., because the two materials 2 may not remain in suitable form to make a beverage if combined and stored together. As an example, a second vessel 15 can contain ethyl alcohol while the first vessel 1 includes an alcohol-free or low alcohol concentrate or drink mix. A closure 3 can be attached to the vessel 1 and be arranged to seal an opening of the vessel 1 (and/or vessel 15) until the container 10 is used to dispense a beverage. The closure 3 can be arranged to provide access to the vessel 1, allowing pressurized gas to be introduced into the vessel 1 to force the beverage material 2 to exit the vessel 1 through the closure 3.

In one illustrative embodiment, the closure 3 includes a pierce-able membrane sealing the opening of the vessel 1 closed and a movable element positioned outside of the internal space of the vessel 1 that is movable relative to the membrane. The movable element can include a piercing element movable to pierce the membrane so as to allow access to the internal space, and a channel to conduct flow of beverage material from the internal space. For example, as can be seen in FIG. 2 the closure 3 is attached to the vessel 1 so as to seal an opening 11 of the vessel 1 closed. In this embodiment, the opening 11 and closure 3 are located at a bottom 12 of the vessel 1, but the opening 11 and closure 3 could be located at a sidewall 13, a top 16, or other locations on a vessel 1. A pierce-able membrane 31, which can include a sheet of material, such as a metal. foil, a polymer, a foil/polymer laminate, or other, can be arranged to seal the opening 11 closed. The membrane 31 can be attached to the vessel 1 at the opening 11, e.g., by welding or adhering the membrane 31 to a rim or lip of the vessel 1 surrounding the opening 11. In such a case, a body 32 of the closure 3 can be attached to the vessel 1 after the membrane 31 is secured in place. Alternately, the membrane 31 can be clamped or squeezed between the body 32 of the closure 3 and the vessel 1, or can be attached to the closure body 32 which itself is sealingly attached to the vessel 1. For example, the closure body 32 can include a wall (such as a cylindrical wall) that defines a pathway 33 through the closure 3 from a top of the closure 3 to a bottom of the closure 3. A ledge 34 can be arranged at an inner surface of the wall (e.g., having an annular shape and extending radially inwardly from the inner surface of the wall), and the membrane 31 can be attached to the ledge 34 to occlude or resist flow through the pathway 33. In this embodiment, the ledge 34 extends radially inwardly relatively far from the wall of the body 32 to define an opening, but the ledge 34 can extend radially inwardly to a lesser degree, e.g., far enough to provide a surface to support the membrane 31 and no more. In any case, the closure 3 can be said to include the membrane 31, even if the membrane 31 is secured to the vessel 1. The body 32 can engage the vessel 1 in different ways, such as by a snap fit, an interference fit, screw thread, welding, adhesive, etc., and engagement of the closure body 32 with the vessel 1 can provide a leak-tight seal, or it may not (e.g., in the case where the membrane 31 is bonded directly to the vessel 1).

To provide access to the internal space of the vessel 1 and allow the beverage material 2 to exit, the closure 3 can include a movable element 35 positioned in the pathway 33 and movable toward the membrane 31 in the pathway 33. The movable element 35 can carry a piercing element 36 such that the piercing element 36 pierces the membrane 31 to open the pathway 33 to a flow of beverage material 2 from the vessel 1. While the movable element 35 can be arranged in different ways, in this embodiment, the movable element 35 includes a disc that is movable in the pathway 33 toward the top of the closure body 32 and the opening 11. The disc can have any suitable shape, such as a circular, oval, square, rectangular, irregular or other shape when viewed from a top. The piercing element 36 can extend upwardly from the upper side of the movable element (e.g., the disc) and be arranged to pierce the membrane 31 with upward movement of the movable element 35. A channel can be provided at an interior of the piercing element 36 such that beverage material 2 can flow through the piercing element 36, or one or more channels can be provided at an exterior of the piercing element 36 for beverage material 2 flow. For example, the piercing element 36 can include a tube with a central channel, or can be arranged as a spike, blade, rod or other structure arranged so beverage material 2 can flow along an outer surface of the piercing element 36.

Figure 3:
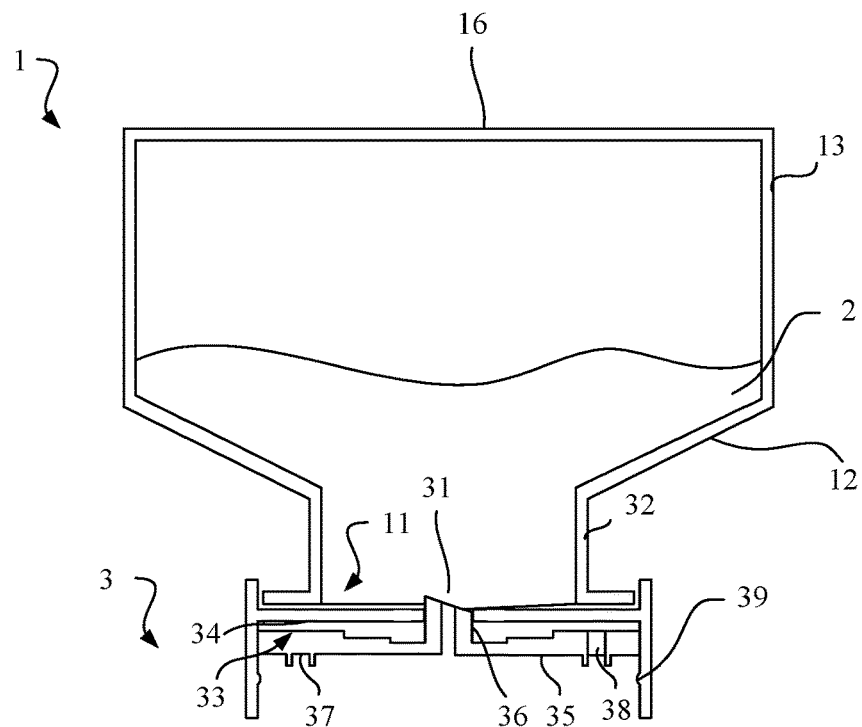
FIG. 3 shows the beverage container of FIG. 2 with a movable element in an upper position.

The closure can also include a gas inlet port arranged to conduct gas from the gas inlet port and into the interior space of the vessel. Introduction of pressurized gas into the vessel can help force the flow of beverage material from the vessel, e.g., where the beverage material is a syrup or if beverage material dispensing should be completed in a short period of time. The gas inlet port can be arranged to mate with a gas source of a beverage machine that provides pressurized air or other gas to the vessel. For example, as can be seen in FIG. 2, the gas inlet port in this embodiment includes an annular groove 37 formed on a bottom side of the movable element 35 and one or more gas openings 38 through the movable element 35 to conduct gas from the annular groove 37 to an upper side of the movable element 35. As is discussed in more detail below, providing an annular groove 37 or other rotationally symmetric feature to receive pressurized gas can make the container 10 insensitive to its rotational positioning when placed in a container receiver of a beverage machine. In this embodiment, pressurized gas introduced into the annular groove 37 can be conducted through the one or more gas openings 38 and into the vessel 1. As can be seen in FIG. 3, the movable element 35 can be moved upwardly so that the piercing element 36 penetrates the membrane 31, thus providing access to the internal space of the vessel 1. Pressurized gas passing through the gas opening(s) 38 can enter a space between the movable element 35 and the membrane 31, and in this embodiment, can pass through a space between the membrane 31 and an exterior of the piercing element 36 while the piercing element is extended through the membrane 31. Introduction of gas into the vessel 1 can increase a pressure in the vessel 1 relative to an external environment, which tends to force beverage material 2 to exit the vessel 1. In this embodiment, the piercing element 36 includes a channel, and beverage material 2 can exit the vessel 1 via the channel under the influence of pressure in the vessel 1. Increasing pressure in the vessel 1 by introducing pressurized gas can be particularly effective if the beverage material 2 is a liquid, such as a syrup or other concentrate, but can also provide benefits if the beverage material 2 is in a powder or other form. The piercing element 36 can include one or more grooves on its exterior surface to help conduct gas flow into the vessel 1, but such features are not necessary and gas can simply pass through any gap between the piercing element 36 and the membrane 31.

Figure 4:
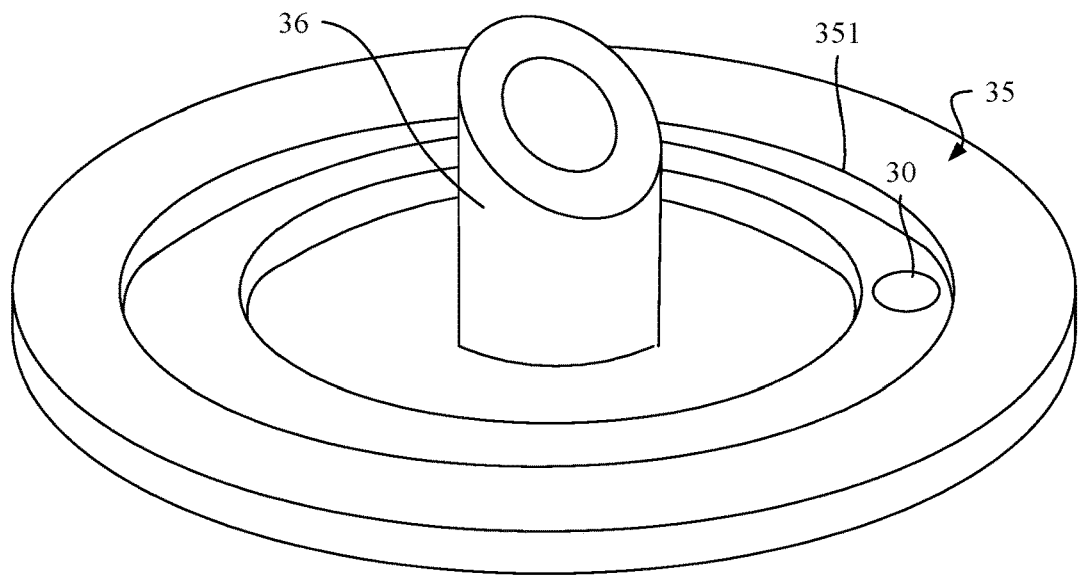
FIG. 4 shows a top perspective view of a movable element in the FIG. 1 embodiment.
Figure 5:
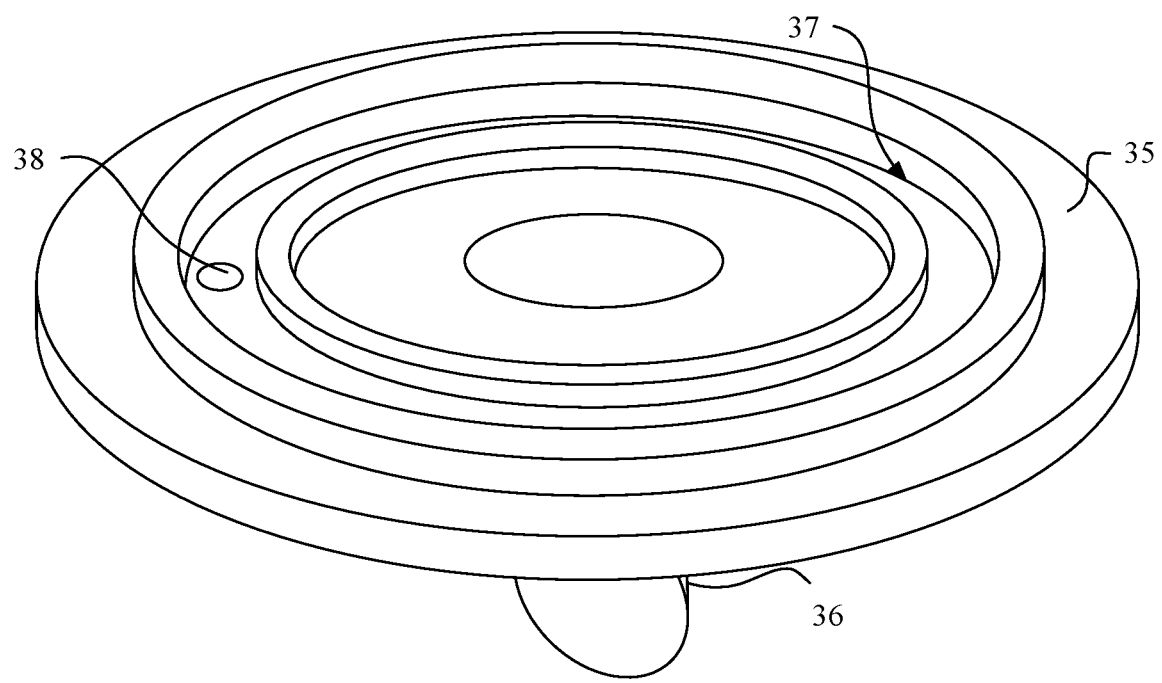
FIG. 5 shows a bottom perspective view of a movable element in the FIG. 1 embodiment.

FIGS. 4 and 5 show perspective top and bottom views of the movable element 35 in the FIGS. 2 and 3 embodiment. As can be seen in FIG. 4, a top side of the movable element 35 includes one or more standoffs 351. The standoff 351 in this embodiment is arranged as a ring around a periphery of the movable element 35, and as can be seen in FIG. 3, helps maintain a gap or air space between the movable element 35 and the ledge 34 when the movable element 35 is moved upwardly. This air space provides a flow path for gas passing through the gas opening(s) 38 and to the vessel 1. Although in this embodiment the standoff 351 is arranged as a ring with a groove positioned inwardly of the ring, the standoff 351 could be arranged in other ways. For example, the standoff 351 could include one or more upstanding pins, one or more radially oriented grooves, or other features to provide a flow path for gas at an upper surface of the movable element 35.

As can be seen in FIG. 5, the annular groove 37 is formed by concentric walls that extend downwardly from the movable element 35. Of course, the annular groove 37 could be formed in other ways, such as by a groove or channel that is formed in the movable element 35. The annular groove 37 is not required, however, and can be eliminated and one or more gas openings 38 used alone. In such a case, the beverage machine can include an annular channel or other port that supplies pressurized gas to the gas opening 38.

In some embodiments, the closure can include a detent arranged to maintain the movable element at a first position in which the membrane is not pierced by the piercing element, and at a second position in which the membrane is pierced by the piercing element. The detent can prevent piercing of the membrane unless a specific amount of force is applied to move the movable element in the closure. Thus, the detent can help prevent unwanted piercing of the membrane, e.g., by a user accidentally pressing on the movable element. The embodiment illustrated in FIGS. 2 and 3 includes a detent arranged as a protrusion 39 that extends inwardly from the inner wall of the closure body 32. When the movable element 35 is located below the protrusion 39 (FIG. 2), the protrusion 39 resists upward movement of the movable element 35 unless a threshold level of force is applied, e.g., 5 to 10 pounds of force or more. When the threshold level of force is applied to the movable element 35, the movable element 35 will move from a first, lower position past the protrusion 39 to a second, higher position in the pathway 33 (FIG. 3). The detent can keep the movable element 35 in the second position, helping to keep the piercing element 36 engaged with the membrane 31. This can aid in providing gas flow into, and beverage material flow out of, the vessel 1, and/or help signal to a user that the container 10 has been used to form a beverage. That is, after a container 10 is used to form a beverage, it may not be readily obvious from other portions of the container 10 that the container 10 has been used. However, by viewing the closure 3, and specifically the position of the movable element 35, a user can easily determine that the container 10 has been previously used. While in this embodiment the detent is formed as a ring-shaped protrusion 39 that extends inwardly from an inner wall of the closure body 32, other arrangements are possible. For example, the detent can be formed by discrete tabs or pins that extend from the inner wall of the body 32, as a groove or series of grooves in the inner wall of the body 32 in combination with a ring-shaped protrusion or other elements on the movable element 35 that cooperate with the groove(s), or other detent configurations.

It should also be appreciated that other arrangements for controlling the movement of the movable element 35 can be employed. For example, the movable element 35 can engage the inner wall of the closure body 32 by a screw thread or cam/cam follower engagement such that the movable element 35 must be rotated to move the movable element 35 toward the membrane 31. In one embodiment, the thread or cam engagement can be configured so that a 90 degree rotation of the movable element 35 relative to the body 32 can move the movable element 35 so that the piercing element 36 pierces the membrane 31 to allow beverage material 2 to exit. Rotation of the movable element 35 or of the closure body 32 can be effected by the beverage machine or by a user, such as by rotating the vessel 1. For example, the movable element 35 can have a tab or other feature that engages with a cartridge receiver so that the movable element 35 remains stationary as the vessel 1 is rotated by a user. This rotation can cause piercing of the membrane 31 to allow access to the interior of the container 10.

Figure 6:
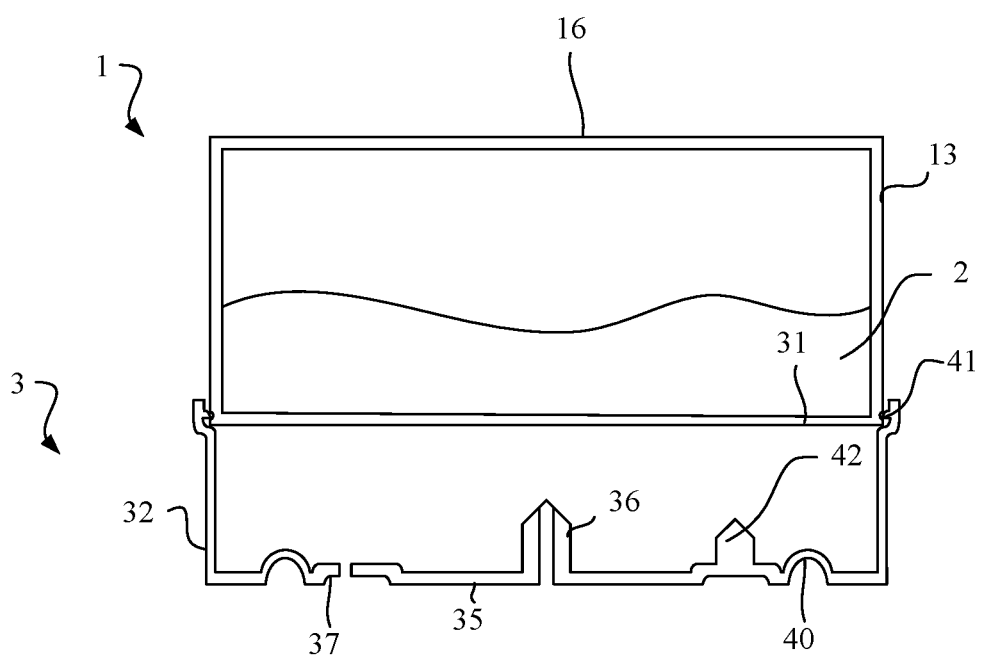
FIG. 6 shows a cross sectional view of a beverage container in another embodiment including a diaphragm connecting a movable element to a closure body.
Figure 7:
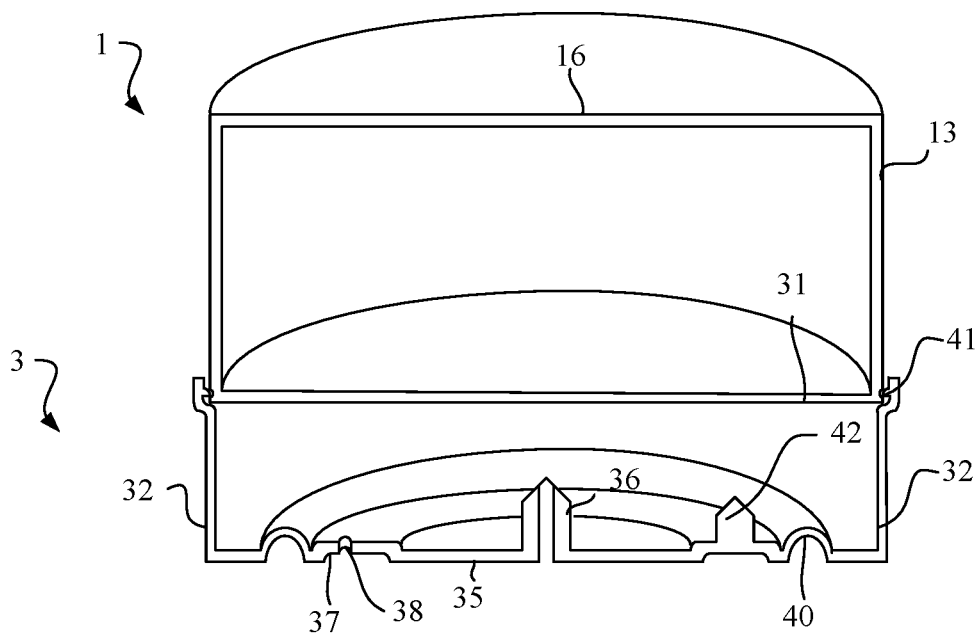
FIG. 7 is a perspective cross sectional view of the FIG. 6 embodiment.

FIGS. 6 and 7 show another illustrative embodiment of a container 10. In this embodiment, the closure 3 is arranged to engage with the vessel 1 by way of a snap fit. Alternatively, as noted above, the closure 3 can engage the vessel 1 by any securing mechanisms including, but in no way limited to, by welding, an adhesive, threaded engagement, etc. An upper end of the closure body 32 includes an engagement feature 41, such as a tooth or other type of engagement feature that engages with a corresponding tooth or other engagement feature on the vessel 1 near the opening 11. In this embodiment, the closure body 32 can be pressed onto the vessel 1 so that the engagement feature 41 engages with the vessel 1 to hold the closure 3 on the vessel 1. The engagement feature 41 can also clamp the membrane 31 between the closure body 32 and the vessel 1 so as to seal the internal space of the vessel closed. Alternately, the membrane 31 can be attached directly to the vessel 1 or the body 32, e.g., by welding or an adhesive. The engagement feature 41 can provide a tamper-evident engagement that resists removal of the closure 3 from the vessel 1, and if the closure 3 is removed from the vessel 1, the engagement feature 41 and/or other portions of the closure 3 or the vessel 1 can break or otherwise deform or be altered so as to prevent re-engagement of the closure 3 with the vessel 1.

Also present in the FIGS. 6 and 7 embodiment is a flexible connector 40 between the movable element 35 and the body 32 of the closure. In this embodiment, the flexible connector 40 includes an annular diaphragm having a U-shaped cross section in a radial direction. Such an arrangement is at least sometimes called a rolling diaphragm, and connects to the movable element 35 at an inner side of the diaphragm and at an outer side to the body 32. This arrangement allows the movable element 35 (in this case including a disc) to move relative to the body 32 while remaining attached to the body 32 and maintaining a seal between the pathway 33 and areas outside of the closure 3. This seal can help direct flow of beverage material 2 to and through the piercing element 36 or other desired flow path. Presence of the flexible connector 40 allows for a one-piece construction of the closure 3 and allowing for the translation of the movable element without separation of the one-piece construction. This configuration allows for the functional translation due to the geometry of the closure 3, a configuration that is known as a compliant mechanism. When a force is input on the moveable element 35, the movable element 35 translates as the flexible connector deforms and allows for the translation. The flexible connector 40 may allow for deformation and thereby translation of the moveable element 35 by having a thinner cross-section compared to the rest of the closure 3, by being formed of a separate and more flexible material, and the like. Note also that this embodiment includes no standoff 351 feature. In this embodiment, the flexible connector 40 limits upward movement of the movable element 35 so that the upper surface of the moveable element 35 does not contact the membrane 31, or the flexible connector 40 can interfere with the membrane 31 to help maintain a suitable gap between the movable element 35 and the membrane 31 to allow gas flow into the vessel 1.

Another feature shown in FIGS. 6 and 7 is that the movable element 35 includes an inlet piercing element 42 arranged to pierce the membrane 31 with movement of the movable element 35 toward the membrane 31 to introduce gas into the internal space of the vessel 1. Similar to the piercing element 36, the inlet piercing element 42 extends upwardly from the movable element 35, e.g., the disc, and can form a hole in the membrane 31 through which gas provided to the gas supply port (e.g., the annular groove 37 and gas openings 38) can flow. The piercing element 36 and inlet piercing element 42 can be arranged so that the piercing element 36 pierces the membrane 31 first as the movable element 35 is moved toward the membrane 31. This way, if there is a pressure inside the vessel 1 that exceeds an ambient pressure, beverage material 2 will flow through the opening formed by the piercing element 36, rather than the hole formed by the inlet piercing element 42.

Figure 8:
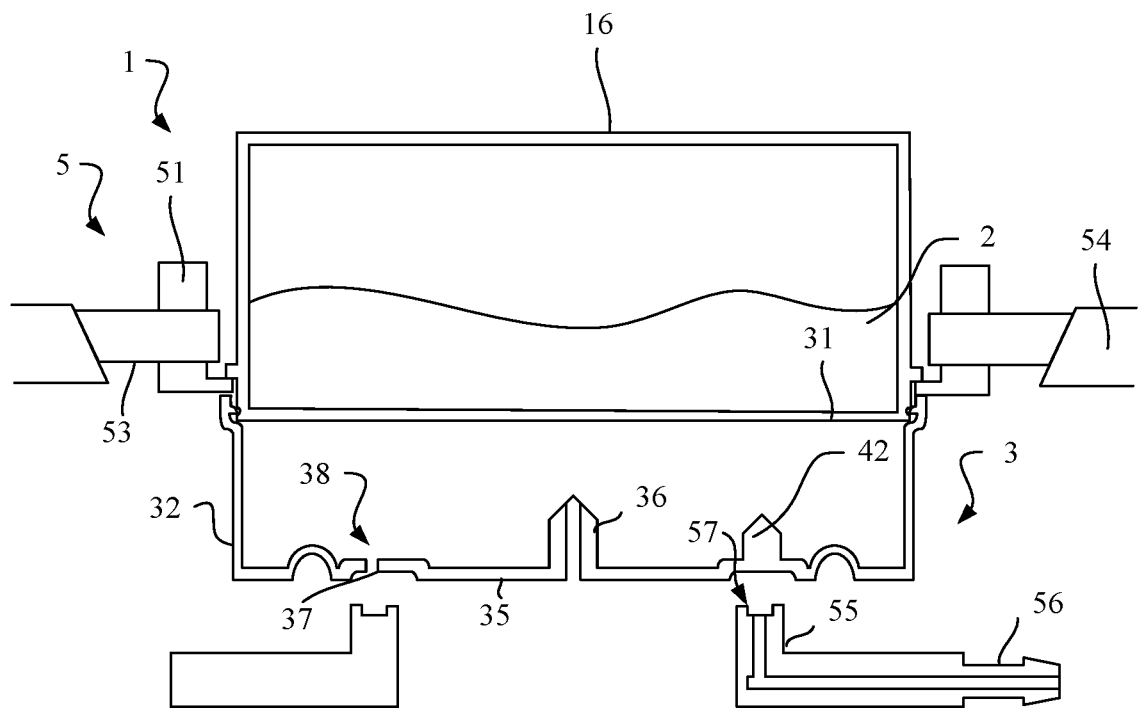
FIG. 8 shows a cross sectional view of the FIG. 6 container held by a container receiver of a beverage machine.
Figure 9:
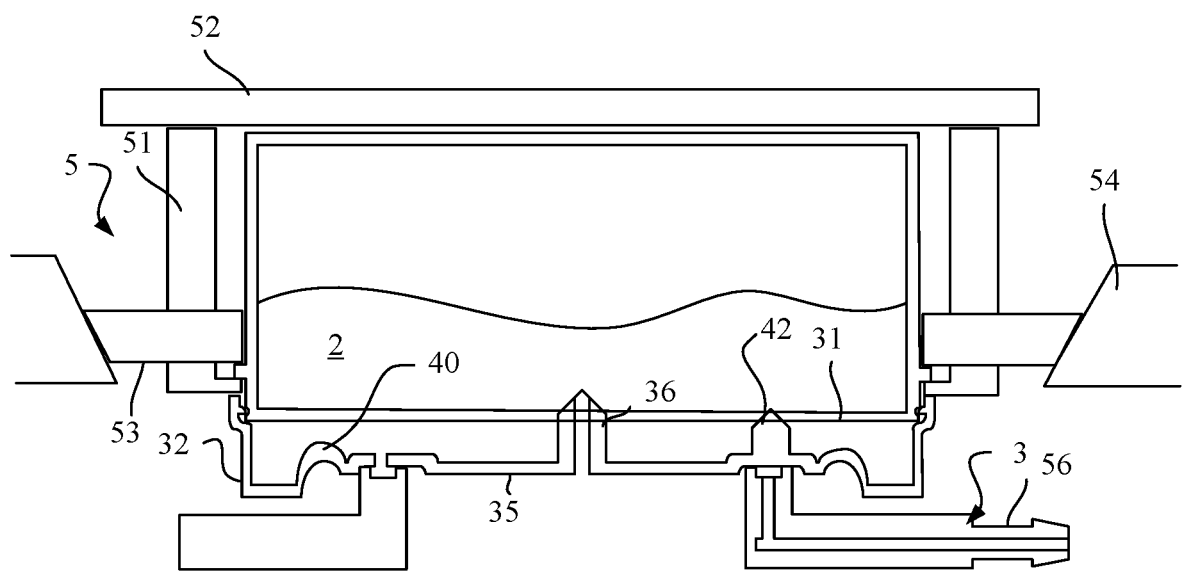
FIG. 9 shows the system of FIG. 8 with the closure of the container engaged with an anvil of the beverage machine.

FIGS. 8 and 9 show the container of FIGS. 6 and 7 engaging with a container receiver of a beverage machine. In this embodiment, the container receiver 5 includes a basket 51 into which the container 10 can be placed. The basket 51 is mounted to move vertically, and is spring biased upwardly to the position shown in FIG. 8. The spring bias on the basket 51 is sufficiently robust to support the weight of the container IO, and so the container IO and basket 51 remain in the position shown in FIG. 8 until the container receiver 5 is closed. When the container receiver 5 is closed, a lid 52 can press downwardly on the basket 51, forcing the basket 51 to move downwardly against the spring bias. Downward movement of the basket 51 causes clamp elements 53 to move inwardly against a spring bias that normally urges the clamp elements 53 to move outwardly. However, downward movement of the basket 51 and the clamp elements 53 which are mounted to the basket 51 causes outer ends of the clamp elements 53 to ride along an inclined surface 54 that pushes the clamp element 53 inwardly. This allows the clamp element 53 to capture a flange 14 of the vessel 1 so that the flange 14 is trapped between a lower portion of the basket 51 and the clamp elements 53. Continued downward movement of the basket 51, clamp elements 53 and the captured container 10 causes the moveable element 35 to contact an anvil 55 of the container receiver 5, which moves the moveable element 35 upward so that the piercing element 36 and the inlet piercing element 42 pierce the membrane 31. The moveable element 35 also engages the anvil 55 so that the annular groove 37 sealingly engages with the anvil 55 so that pressurized gas can be delivered by a gas supply 56 to the gas inlet port and into the vessel 1. This causes beverage material 2 to exit the vessel 1 via the piercing element 36, e.g., a channel in the piercing element 36, for direct dispensing into a user's cup or into a mixing chamber for mixing the beverage material 2 and water or other liquid. After dispensing of the beverage material 2, the lid 52 can be lifted, allowing the spring bias on the basket 51 to move the 51 upwardly and the clamp element 53 to move outwardly to release the container 10. In this embodiment, the gas supply 56 includes an annular groove 57 in an upper surface of the anvil 55 that is arranged to mate with the annular groove 57 of the movable element 35. However, this is not necessary, and the gas supply 56 can include one or more holes in the upper surface of the anvil 55 to deliver pressurized gas to the annular groove 57.

It should be understood that a container receiver 5 is not necessarily limited to the embodiments described herein. For example, the container receiver 5 can open and close in any suitable way to allow containers 10 to be placed in and/or removed from the container receiver 5. In one embodiment, a container receiver 5 can include a lid pivotally mounted to a receiver or basket portion of the container receiver 5, and can be opened and closed manually, such as by a handle and linkage arrangement, or automatically, such as by a motor drive, to close the container receiver 5. Of course, the lid 52 can be arranged in other ways, such as being engaged with the lower portion by a threaded connection (like a screw cap), by the moving the basket portion relative to the lid while the lid remains stationary, by both the lid and basket portion moving, and so on. In addition, a container receiver 5 need not necessarily have a lid and basket alignment, but instead can have any suitable member or members that cooperate to open/close and support a container. For example, a pair of clamshell members can be movable relative to each other to allow receipt of a container and physical support of the container. Some other illustrative container holder arrangements are 5 shown, for example, in U.S. Pat. Nos. 6,142,063; 6,606,938; 6,644,173; and 7,165,488.

Figure 10:
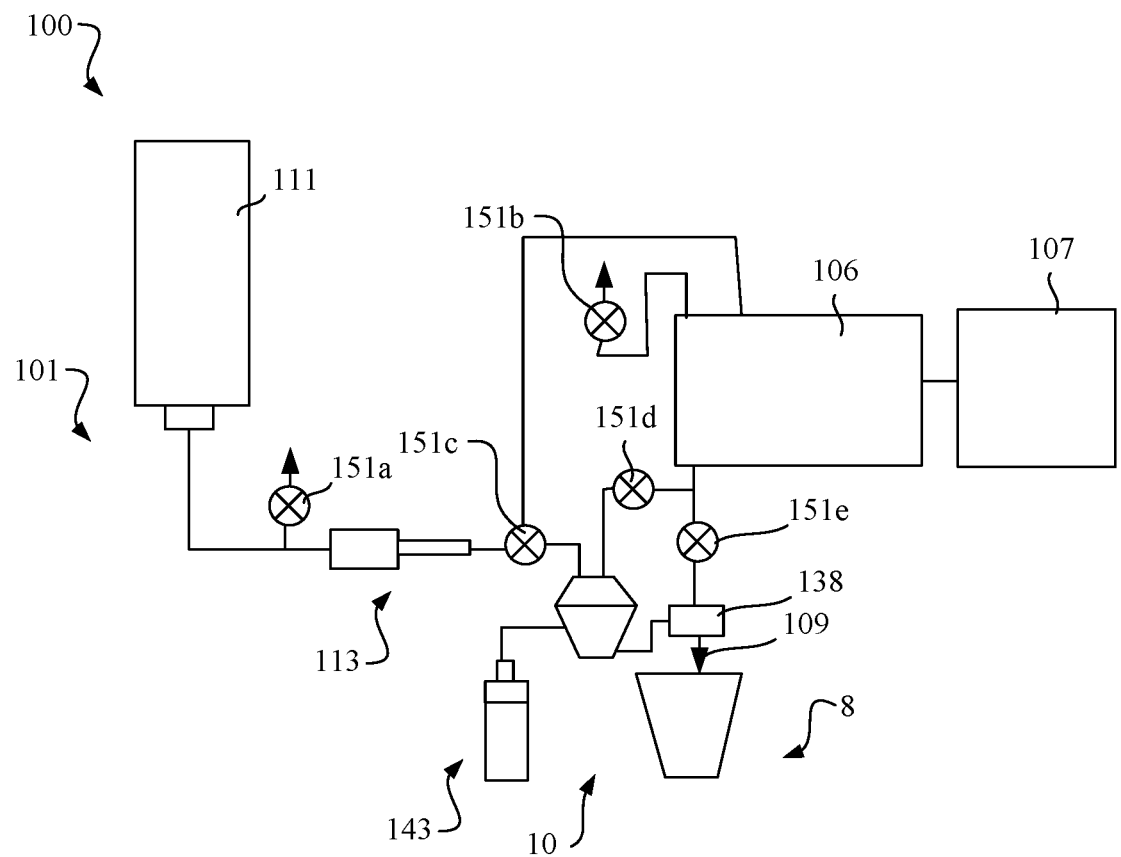
FIG. 10 shows a schematic diagram of a beverage system in one embodiment.

FIG. 10 shows a schematic view of a beverage system 100 that can be used with a container 10 that incorporates exemplary features of the present systems and methods. In this illustrative embodiment, precursor liquid such as water is provided by a precursor liquid supply 101 that originates in the reservoir 111, which can be removable from the system 100, e.g., to allow for easier filling, or can be 10 fixed in place. Although in this embodiment, a user initially provides the beverage precursor liquid in the reservoir 111, the precursor liquid supply 101 can include other components to provide liquid to the reservoir 111, such as a plumbed water line, controllable valve, and liquid level sensor to automatically fill the reservoir 111 to a desired level, a second water reservoir or other tank that is fluidly connected to the reservoir 111, and other arrangements. Liquid is delivered by a pump 113 to the carbonation tank 106 via a three-way valve 151c. In this instance, the pump 113 is a solenoid pump, but other pump types are possible. The carbonation tank 106 can be suitably filled with liquid using any suitable control method, such as by sensing a level in the carbonation tank 106 using a conductive probe, pressure sensor, optical sensor or other sensor. A tank vent valve 151b can be opened during filling to allow the pressure in the carbonation tank 106 to vent, or can remain closed during filling, e.g., to allow a pressure build up in the carbonation tank 106. Though not shown in FIG. 10, a control circuit can control operation of the valves 151, e.g., the valves 151 can include electromechanical or other actuators, as well as include sensors to detect various characteristics, such as temperature in the carbonation tank 106, pressure in the carbonation tank 106, a flow rate of gas or liquid in any of the system flow lines, etc.

To form a beverage, a user can associate a container 10 with the system 100, e.g., by loading the container 10 into a container receiver 5 in a way like that discussed with respect to FIGS. 8 and 9. In this embodiment, however, the container 10 includes a lower vessel 1 arranged like that described above, and an upper vessel 15 that contains a gas source arranged to release carbon dioxide or other gas under pressure for dissolution in a liquid, e.g., for carbonating water. With the container 10 associated with the system 100, the control circuit can then activate the system 100 to deliver liquid to the upper vessel 15, e.g., to cause carbon dioxide to be generated. (Though this embodiment uses a container 10 with a gas source activated by a fluid, other arrangements are possible, including the use of a pressurized gas cylinder as a gas source.) The control circuit can start operation of the system 100 in an automated way, e.g., based on detecting the presence of a container 10, detecting liquid in the carbonation tank 106 and closure of the container receiver 5, and/or other characteristics of the system 100. Alternately, the control circuit can start system operation in response to a user pressing a start button or otherwise providing input (e.g., by voice activation) to start beverage preparation.

To initiate carbonation, the vent valve 151*b* can be closed and the three-way valve 151*c* controlled to allow the pump 113 to pump liquid into the upper vessel 15 that contains a gas source. That is, the system 100 can include a carbon dioxide activating fluid supply that provides a fluid to a upper vessel 15 so as to activate a carbon dioxide source in the upper vessel 15 to release carbon dioxide gas. In this embodiment, the carbon dioxide source includes a charged adsorbent or molecular sieve, e.g., a zeolite material that has adsorbed some amount of carbon dioxide gas that is released in the presence of water, whether in vapor or liquid form. Of course, other carbon dioxide source materials can be used, such as charcoal or other molecular sieve materials, carbon nanotubes, metal organic frameworks, covalent organic frameworks, porous polymers, or source materials that generate carbon dioxide by chemical means, such as sodium bicarbonate and citric acid (with the addition of water if the bicarbonate and acid are initially in dry form), compressed carbon dioxide bottle gas, or others. In addition, aspects of the exemplary system and method are not necessarily limited to use with carbon dioxide gas, but can be used with any suitable gas, such as nitrogen, which is dissolved in some beers or other beverages, oxygen, air, and others. Thus, reference to "carbonation," "carbon dioxide source," "carbon dioxide activating fluid supply," etc., should not be interpreted as limiting aspects of the exemplary system and method and/or any embodiments to use with carbon dioxide only. Instead, aspects of the exemplary system and method can be used with any suitable gas.

In one embodiment, the charged adsorbent is a zeolite such as analcime, chabazite, clinoptilolite, heulandite, natrolite, phillipsite, or stilbite. The zeolite can be naturally occurring or synthetic, and can be capable of holding up to about 18% carbon dioxide by weight or more. The zeolite material can be arranged in any suitable form, such as a solid block (e.g., in disc form), particles of spherical, cubic, irregular or other suitable shape, and others. An arrangement that allows the zeolite to flow or be flowable, e.g., spherical particles, can be useful for packaging the zeolite in individual containers. Such an arrangement can allow the zeolite to flow from a hopper into a container, for example, simplifying the manufacturing process. The surface area of the zeolite particles can also be arranged to help control the rate at which the zeolite releases carbon dioxide gas, since higher surface area measures typically increase the gas production rate. Generally, zeolite materials will release adsorbed carbon dioxide in the presence of water in liquid or vapor form, allowing the zeolite to be activated to release carbon dioxide gas by the addition of liquid water to the zeolite.

The carbon dioxide activating fluid supply in this embodiment includes a conduit that is fluidly coupled to the pump 113 and the valve 151*c* that can be controlled to open/close or otherwise control the flow of precursor liquid into the upper vessel 15. That is, a single pump can be arranged to both deliver precursor liquid to the carbonation tank and deliver activating fluid to a gas source. Other arrangements or additions are possible for the carbon dioxide activating fluid supply, such as a dedicated liquid supply for the upper vessel 15 that is separate from the precursor liquid supply, a pressure-reducing element in the conduit, a flow-restrictor in the conduit, a flow meter to indicate an amount and/or flow rate of fluid into the vessel 15, a syringe, piston pump or other positive displacement device that can meter desired amounts of liquid (whether water, citric acid or other material) to the vessel 15, and others. In another embodiment, the activating fluid supply can include a gravity fed liquid supply that has a controllable delivery rate, e.g., like the drip-type liquid supply systems used with intravenous lines for providing liquids to hospital patients, or can spray atomized water or other liquid to provide a water vapor or other gas phase activating fluid to the upper vessel 15.

A carbon dioxide gas supply can be arranged to provide carbon dioxide gas from the upper vessel 15 to an area where the gas is used to carbonate the liquid, in this case, the carbonation tank 106. The gas supply can be arranged in any suitable way, and in this illustrative embodiment includes a conduit that is fluidly connected between the upper vessel 15 and a carbonated liquid outlet of the carbonation tank 106. A gas control valve 151*d* is controllable by the control circuit to open and close the flow path through the gas supply conduit. (Note that in some embodiments, the gas control valve 151*d* can be a check valve that is not controllable by the control circuit.)

The gas supply can include other components than a conduit and valve, such as pressure regulators, safety valves, additional control valves, a compressor or pump (e.g., to increase a pressure of the gas), an accumulator (e.g., to help maintain a relatively constant gas pressure and/or store gas), and so on. (The use of an accumulator or similar gas storage device can obviate the need to control the rate of gas output by a container. Instead, the gas source can be permitted to emit gas in an uncontrolled manner, with the emitted gas being stored in an accumulator for later delivery and use in producing a sparkling beverage. Gas released from the accumulator could be released in a controlled manner, e.g., at a controlled pressure and/or flow rate.) Also, carbonation of the precursor liquid can occur via one or more mechanisms or processes, and thus is not limited to one particular process. For example, while delivery of carbon dioxide gas to the outlet of the carbonation tank 106 can function to help dissolve carbon dioxide in the liquid, other system components can further aid in the carbonation process. In some embodiments, a sparger can be used to introduce gas into the carbonation tank, precursor liquid can be circulated in the tank, and/or other techniques can be used to alter a rate at which carbonating gas is dissolved.

Before, during and/or after carbonation of the liquid in the carbonation tank 106, a system 107 can chill the liquid. As noted above, the cooling system 7 can operate in any suitable way, e.g., can include ice, refrigeration coils or other cooling elements in thermal contact with the carbonation tank 106. In addition, the carbonation tank 106 can include a mixer or other agitator to move the liquid in the carbonation tank 106 to enhance gas dissolution and/or cooling. Operation in forming a beverage can continue for a preset amount of time, or based on other conditions, such as a detected level of carbonation, a drop in gas production by the upper vessel 15, or other parameters. During operation, the amount of liquid provided to the upper vessel 15 can be controlled to control gas output. Control of the liquid provided to the upper vessel 15 can be made based on a timing sequence (e.g., the valve 151*c* can be opened for a period of time, followed by valve closure for a period, and so on), based on detected pressure (e.g., liquid supply can be stopped when the pressure in the carbonation tank 106 exceeds a threshold, and resume when the pressure falls below the threshold or another value), based on a volume of activating liquid delivered to the upper vessel 15 (e.g., a specific volume of liquid can be delivered to the vessel 15 in one or more discrete volumes), or other arrangements.

With the precursor liquid in the carbonation tank 106 ready for dispensing, the vent valve 151b can be opened to reduce the pressure in the carbonation tank 106 to an ambient pressure. As is known in the art, depressurizing the carbonation tank prior to dispensing can aid in maintaining a desired carbonation level of the liquid during dispensing. With the carbonation tank 106 vented, the vent valve 151b can be closed and a pump vent valve 151a can be opened. The pump 113 can then be operated to draw air or other gas into the inlet side of the pump 113 and pump the gas into the carbonation tank 106 so as to force the precursor liquid in the carbonation tank 106 to flow into the dispense line 138. While the pump 113 delivers air to the carbonation tank, the dispense valve 151e is opened and the gas control valve 151d is closed during liquid dispensing. The dispensed liquid can enter a mixing chamber 109 at which the carbonated liquid and beverage material 2 provided from the lower vessel 1 of the container 10 are combined. The beverage material can be moved out of the vessel 1 and to the mixing chamber 109 by introducing pressurized gas into the vessel 1, e.g., by way of an air pump 143.

The control circuit can use one or more sensors to control a carbonation level of the precursor liquid, a temperature to which the liquid is chilled (if at all), a time at which and during which beverage material is delivered to the mixing chamber 109, a rate at which carbonating gas is produced and delivered to the carbonation tank 106, and/or other aspects of the beverage making process. For example, a temperature sensor can detect the temperature of the precursor liquid in the carbonation tank 106. This information can be used to control system operation, e.g., warmer precursor liquid temperatures can cause the control circuit to increase an amount of time allowed for carbon dioxide gas to be dissolved in the precursor liquid. In other arrangements, the temperature of the precursor liquid can be used to determine whether the system 100 will be operated to carbonate the liquid or not. For example, in some arrangements, the user can be required to add suitably cold liquid (and/or ice) to the reservoir 111 before the system 100 will operate. (As discussed above, relatively warm precursor liquid temperatures can cause the liquid to be insufficiently carbonated in some conditions.) In another embodiment, a pressure sensor can be used to detect a pressure in the carbonation tank 106. This information can be used to determine whether the carbonation tank 106 is properly or improperly filled, if a pressure leak is present, if carbonation is complete and/or to determine whether sufficient carbon dioxide gas is being produced by the upper vessel 15. For example, low detected pressure can indicate that more carbon dioxide needs to be generated, and thus cause the control circuit to allow more liquid to be delivered by the activating fluid supply to the upper vessel 15. Likewise, high pressures can cause the flow of liquid from the activating fluid supply to be slowed or stopped. Thus, the control circuit can control the gas pressure in the carbonation tank 106 and/or other areas of the system 100 by controlling an amount of liquid delivered to the upper vessel 15. Alternately, low pressure can indicate that there is a leak in the system and cause the system to indicate an error is present. In some embodiments, measured pressure can indicate that carbonation is complete. For example, pressure in the carbonation tank 106 can initially be detected to be at a high level, e.g., around 70-80 psi, and later be detected to be at a low level, e.g., around 40 psi due to gas being dissolved in the liquid. The low pressure detection can indicate that carbonation is complete.

The control circuit can also be arranged to allow a user to define a level of carbonation (i.e., amount of dissolved gas in the beverage, whether carbon dioxide or other). For example, the control circuit can include a touch screen display or other user interface that allows the user to define a desired carbonation level, such as by allowing the user to select a carbonation volume level of 1, 2, 3, 4, or 5, or selecting one of a low, medium or high carbonation level. Containers used by the system 100 can include sufficient gas source material to make the highest level of carbonation selectable, but the control circuit can control the system to dissolve an amount of gas in the beverage that is consistent with the selected level. For example, while all containers can be arranged for use in creating a "high" carbonation beverage, the control circuit can operate the system 100 to use less of the available gas (or cause the gas source to emit Jess gas than possible) in carbonating the beverage. Carbonation levels can be controlled based on a detected carbonation level by a sensor, a detected pressure in the carbonation tank 6 or elsewhere, an amount of gas output by the container TO, or other features.

In another embodiment, the container 10 can include indicia readable by the controller, e.g., a RFID tag, barcode, alphanumeric string, etc., that indicates a carbonation level to be used for the beverage. After determining the carbonation level from the container 10, the control circuit can control the system 100 accordingly. Thus, a user need not select the carbonation level by interacting with the system 100, but rather a carbonation level can 20 be automatically adjusted based on the beverage selected. In yet another embodiment, a user can be able to select a gas source vessel 15 that matches a carbonation level the user desires. (Different carbonation levels can be provided in the different containers by having different amounts of gas source in the vessel 15.) For example, container 10 providing low, medium and high carbonation levels can be provided for selection by a user, and the user can pick the container 10 that matches the desired carbonation level, and provide the selected container to the system. Thus, a gas source vessel 15 labeled "low" can be chosen and used with the system to create a low level carbonated beverage.

A user can alternately be permitted to define characteristics of a beverage to be made by interacting in some way with a container IO to be used by the system 100. For example, tab, notch or other physical feature of the container 10 can be altered or formed by the user to signify a desired beverage characteristic. For example, a broken tab, slider indicator, a covered or uncovered perforation on a portion of the container 10, etc., that is created by the user can indicate a desired carbonation level, an amount of beverage material to use in forming the beverage (where the system 100 is controllable to use less than all of the beverage material in the container to form a beverage), and so on. Features in the container 10 can also be used by the control circuit to detect features of the container 10, a beverage being formed or other components of the system 100.

The container 10 can be made of any suitable materials, and is not necessarily limited to the constructions shown herein. For example, the container 10 can be made of, or otherwise include, materials that provide a barrier to moisture and/or gases, such as oxygen, water vapor, etc. In one embodiment, the container 10 can be made of a polymer laminate, e.g., formed from a sheet including a layer of polystyrene, polypropylene and/or a layer of EVOH and/or other barrier material, such as a metallic foil. In one embodiment, the container 10 is injection molded. Moreover, the container 10 materials and/or construction can vary according to the materials contained in the container 10. For example, a portion of the container 10 containing a gas source material can require a robust moisture barrier, whereas a beverage material portion may not require such a high moisture resistance. Thus, the containers can be made of different materials and/or in different ways. In addition, the container 10 interior can be differently constructed according to a desired function. Thus, as used herein, a "container" can take any suitable form, such as a pod (e.g., opposed layers of filter paper encapsulating a material), capsule, sachet, package, or any other arrangement. The container 10 can have a defined shape, or can have no defined shape (as is the case with some sachets or other packages made entirely of flexible material). The container can be impervious to air and/or liquid, or can allow water and/or air to pass into the container.

In accordance with one aspect of the exemplary system and method, the container includes an indicator that is readable by a beverage making system or other indicator reader. As non-limiting, illustrative examples, the indicator can be an RFID tag, barcode, alphanumeric string, taggant, taggant ink, or other suitable indicator. The indicator can be used to provide any suitable information to the beverage making system or to another reader. For example, the indicator can inform the beverage making system of the type of contents contained within the container such as a specific flavor, volume, gas-only or beverage material-only, which can cause the beverage making system to perform operation that is suitable for such contents. In some embodiments, the indicator can provide product authentication, expiration information, and/or manufacturing information such as lot number and manufacturing facility.

Figure 11:
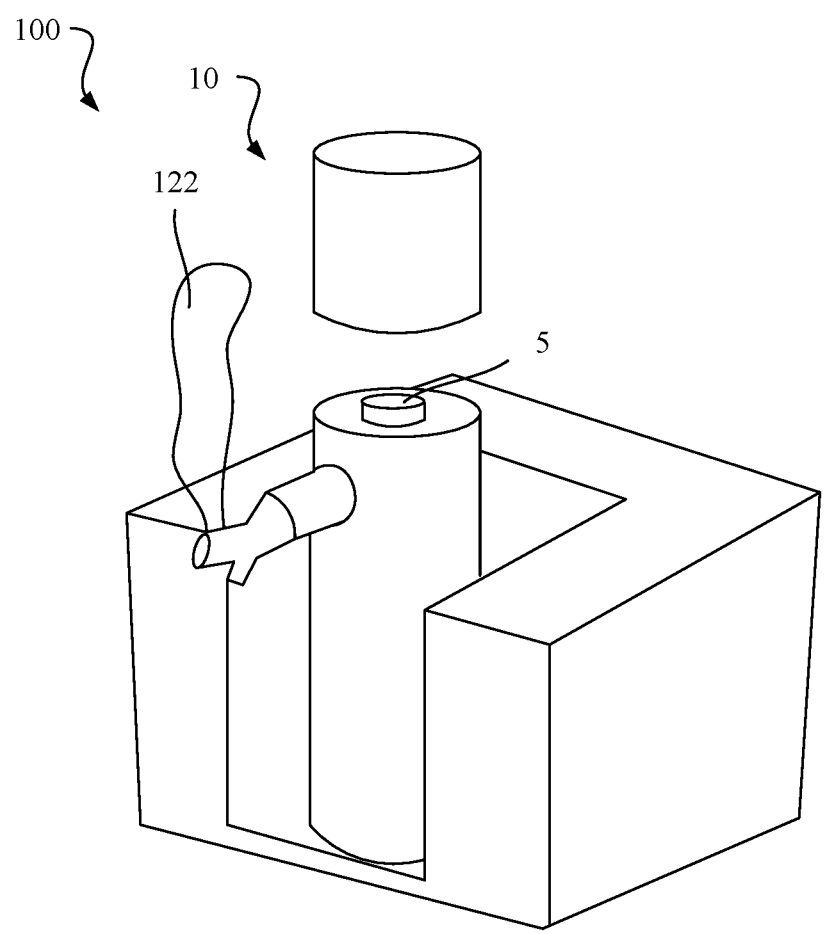
FIG. 11 shows a perspective view of a beverage system including a tap handle.

FIG. 11 shows a beverage system 100 in an embodiment that includes a tap handle 122 and can be used with any of the containers 10 discussed above or other modified versions of a container 10. As an example, components of a system 100 shown in FIG. 10 can be employed in the system of FIG. 11, or other configurations could be used. In this embodiment, the system 100 includes a container receiver 5 arranged at a top of a stand that can engage with a container 10 placed on the container receiver 5. The container receiver 5 can be arranged like that shown in FIGS. 8 and 9, i.e., including components that engage with the container 10 and move to open the container 10 for dispensing beverage material 2. In another embodiment, the container receiver 5 can engage the container 10 by a twist-type engagement, such as a screw thread or other similar connection. For example, the closure 3 or other part of the container 10 can include a screw thread, bayonet connector, or other arrangement configured to engage with a complementary feature of the container receiver 5 (such as a screw thread or other twist lock arrangement, grooves or other openings to receive bayonet elements, etc.). Thus, a user can place the container 10 on the container receiver 5, and then engage the container 10 with the receiver 5 by twisting the container 10 relative to the receiver 5. This action can serve to open the container 10 for dispensing, e.g., a movable element of the closure 3 can be moved relative to a membrane 31 so that the membrane 31 is pierced by a piercing element 36. Alternately, the container 10 can be engaged with the receiver 5 and other action, such as a user pulling on the tap handle 122 or pressing a button, can cause the movable element 35 to move to open the container 10 for dispensing. Such action can also cause the system 100 to introduce gas into the container 10 to cause dispensing of the beverage material 2, e.g., into a mixing chamber for mixing with a carbonated water or other liquid and subsequent dispensing of a beverage to a user's cup.

Having thus described several aspects of at least one embodiment of this exemplary system and method, it is to be appreciated that various alterations, modifications, and improvements will readily occur to those skilled in the art. Such alterations, modifications, and improvements are intended to be part of this disclosure, and are intended to be within the spirit and scope of the exemplary system and method. Accordingly, the foregoing description and drawings are by way of example only.

The invention claimed is:

1. A beverage container, comprising:
 a vessel having an internal space and an opening to the internal space;
 a beverage material located in the internal space;
 a pierce-able membrane sealing the opening closed; and
 a closure including:
  a body attached to the vessel and closing the opening,
  a movable element positioned outside of the internal space and that is movable relative to the body and the membrane, the movable element including an engagement surface, a piercing element extending from the engagement surface and movable with the engagement surface to pierce the membrane, a channel to conduct flow of the beverage material from the internal space, and a gas inlet port configured to be coupled to a gas supply of a beverage machine and configured to deliver gas into the internal space through a hole in the membrane to force the beverage material to flow into the channel, and
  an annular diaphragm having a first portion connected to the body and a second portion connected to the engagement surface, wherein the annular diaphragm is configured to permit relative movement of the engagement surface and the body while the first portion is positionally fixed relative to the body and second portion is positionally fixed relative to the engagement surface.

2. The beverage container of claim 1, wherein the vessel includes a bottom, a sidewall extending upwardly from the bottom, and a top at an upper portion of the sidewall, and wherein the opening is located at the bottom.

3. The beverage container of claim 1, wherein the body of the closure includes an engagement feature that defines a threaded engagement between the closure and the vessel at the opening.

4. The beverage container of claim 1, wherein:
 the closure has a pathway extending from a top of the closure to a bottom of the closure,
 the membrane is attached in the closure to occlude the pathway, and
 the annular diaphragm is configured to allow movement of the movable element relative to the body while maintaining a seal between the pathway and areas outside of the closure.

5. The beverage container of claim 1, wherein the vessel is a first vessel, the beverage container further comprising a second vessel attached to, and isolated from, the first vessel.

6. The beverage container of claim 1, wherein the closure includes a wall that defines a pathway through the closure, the wall including a ledge at an inner surface of the wall, and wherein the membrane is attached to the ledge to occlude the pathway.

7. The beverage container of claim 6, wherein the movable element is positioned in the pathway and is movable toward the membrane such that the piercing element pierces the membrane to open the pathway to flow.

8. The beverage container of claim 1, wherein the annular diaphragm has a U-shaped cross section in a radial direction extending between a substantially cylindrical wall of the body and the movable element.

9. The beverage container of claim 8, wherein the membrane is held between the wall and the vessel at the opening.

10. The beverage container of claim 1, wherein the gas inlet port includes an inlet piercing element arranged to pierce the membrane with movement of the movable element toward the membrane to introduce gas into the internal space.

11. The beverage container of claim 10, wherein the inlet piercing element defines a projection from an upper side of the movable element and is arranged to pierce the membrane with upward movement of the movable element, the closure arranged to conduct gas through a space between the membrane and an exterior of the inlet piercing element with the inlet piercing element extending through the membrane.

12. The beverage system of claim 1, wherein the closure is defined by a one-piece structure.

13. The beverage system of claim 12, wherein the one-piece structure allows for a translation of the movable element without separation from the closure.

14. The beverage container of claim 1, wherein the gas inlet port includes an annular groove defined on a bottom side of the movable element and one or more gas openings through the movable element to conduct gas from the annular groove to an upper side of the movable element.

15. The beverage container of claim 14, wherein the piercing element defines an elongated projection on the upper side of the movable element and is arranged to pierce the membrane with upward movement of the movable element, the closure arranged to conduct gas from the gas inlet port through a space between the membrane and an exterior of the piercing element with the piercing element extending through the membrane.

16. The beverage container of claim 15, wherein the channel is provided at an interior of the piercing element such that the beverage material is flowable through the piercing element.

17. The beverage container of claim 1, wherein the movable element includes a disc mounted for movement toward the membrane.

18. The beverage container of claim 17, further comprising an inlet piercing element that extends upwardly from the disc and is arranged to pierce the membrane with movement of the disc toward the membrane to introduce gas into the internal space.

19. The beverage container of claim 17, wherein the piercing element extends upwardly from the disc.

20. The beverage container of claim 19, wherein the channel extends through the piercing element.

21. A beverage container, comprising:
a vessel having an internal space and an opening defined by the vessel that extends to the internal space;
a beverage material disposed in the internal space;
a pierce-able membrane sealing the opening; and
a closure including:
a body attached to the vessel and covering the opening;
a movable element positioned outside the internal space, the movable element movable relative to the body and the membrane, the movable element including an engagement surface, a piercing element extending from the engagement surface and movable with the engagement surface to pierce the membrane, a channel to conduct a flow of the beverage material from the internal space, and a gas inlet port configured direct gas into the internal space through a hole in the membrane; and
an annular diaphragm connecting the body and the engagement surface, the annular diaphragm having a rigidity less than a rigidity of both the body and the movable element, the annular diaphragm defining a flexible region of the closure between the engagement surface and the body.

22. The beverage container of claim 21, wherein:
the annular diaphragm includes a first portion connected to the body and a second portion connected to the engagement surface; and
the annular diaphragm is configured to permit relative movement of the engagement surface and the body while the first portion is positionally fixed relative to the body and the second portion is positionally fixed relative to the engagement surface.

23. The beverage container of claim 21, wherein the closure is defined by a one-piece structure.

24. The beverage container of claim 21, wherein the annular diaphragm is configured to allow movement of the movable element relative to the body while maintaining a seal between a pathway defined by the closure and areas outside of the closure.

25. The beverage container of claim 21, wherein the body of the closure includes an engagement feature that positionally fixes the closure to the vessel during a translation of the movable element.

26. A beverage container, comprising:
a vessel having an internal space, the vessel defining an opening that extends to the internal space;
a beverage material disposed in the internal space;
a pierce-able membrane sealing the opening; and
a closure being a one-piece structure, the closure including:
a body attached to the vessel and covering the opening;
a pathway defined by the closure, the pathway extending from a top of the closure to a bottom of the closure, wherein the pierce-able membrane occludes the pathway;
a movable element positioned outside of the internal space and movable relative to the body and the membrane, the movable element including an engagement surface, a piercing element extending from the engagement surface and movable with the engagement surface to pierce the membrane, a channel defined by the moveable element to conduct flow of the beverage material from the internal space, and a gas inlet port configured to deliver gas into the internal space through a hole in the membrane to force the beverage material to flow into the channel; and
an annular diaphragm configured to allow movement of the movable element relative to the body while maintaining a seal between the pathway and areas outside of the closure.

27. The beverage container of claim 26, wherein the annular diaphragm comprises a thinned region of the closure.

28. The beverage container of claim 26, wherein the annular diaphragm is configured to limit movement of the movable element toward the pierceable membrane.

29. The beverage container of claim 26, wherein the body of the closure includes an engagement feature that defines a threaded engagement between the closure and the vessel at the opening.

* * * * *